(12) United States Patent
Schaer et al.

(10) Patent No.: US 11,789,695 B2
(45) Date of Patent: Oct. 17, 2023

(54) AUTOMATIC ADJUSTMENT OF MUTED RESPONSE SETTING

(71) Applicant: GOOGLE LLC, Mountain View, CA (US)

(72) Inventors: Michael Schaer, Pfaffikon (CH); Vitaly Gatsko, Zurich (CH); Ágoston Weisz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/965,349

(22) Filed: Oct. 13, 2022

(65) Prior Publication Data
US 2023/0033396 A1 Feb. 2, 2023

Related U.S. Application Data

(63) Continuation of application No. 16/948,089, filed on Sep. 2, 2020, now Pat. No. 11,474,773.

(51) Int. Cl.
| | |
|---|---|
| G06F 3/16 | (2006.01) |
| G10L 15/22 | (2006.01) |
| G06F 16/909 | (2019.01) |
| G06F 16/9032 | (2019.01) |

(52) U.S. Cl.
CPC .............. *G06F 3/165* (2013.01); *G06F 3/167* (2013.01); *G06F 16/909* (2019.01); *G06F 16/90332* (2019.01); *G10L 15/22* (2013.01)

(58) Field of Classification Search
CPC .. G06F 3/165; G06F 16/909; G06F 16/90332; G06F 3/167; G01L 15/22
See application file for complete search history.

(56) References Cited

U.S. PATENT DOCUMENTS

| | | | |
|---|---|---|---|
| 10,466,955 B1* | 11/2019 | Gray | G06F 3/165 |
| 10,514,888 B1* | 12/2019 | Rodgers | G10L 25/78 |
| 10,797,670 B2* | 10/2020 | Knode | H04R 3/00 |
| 2007/0192782 A1* | 8/2007 | Ramaswamy | H04N 21/426 |
| | | | 725/15 |
| 2014/0195230 A1* | 7/2014 | Han | G10L 15/22 |
| | | | 704/235 |
| 2014/0280879 A1 | 9/2014 | Skolicki | |
| 2014/0365880 A1 | 12/2014 | Bellegarda | |
| 2018/0315441 A1* | 11/2018 | Sapienza | G09B 19/04 |

(Continued)

*Primary Examiner* — Mohammad K Islam
(74) *Attorney, Agent, or Firm* — Gray Ice Higdon

(57) ABSTRACT

Techniques enable an automatic adjustment of a muted response setting of an automated assistant based on a determination of an expectation by a user to hear an audible response to their query, despite the muted setting. Determination of the expectation may be based on historical, empirical data uploaded from multiple users over time for a given response scenario. For example, the system may determine from the historical data that a certain type of query has been associated with a user both repeating their query and increasing a response volume setting within a given timeframe. Metrics may be generated, stored, and invoked in response to attributes associated with identifiable types of queries and query scenarios. Automated response characteristics meant to reduce inefficiencies may be associated with certain queries that can otherwise collectively burden network bandwidth and processing resources.

20 Claims, 9 Drawing Sheets

(56) References Cited

U.S. PATENT DOCUMENTS

| | | | |
|---|---|---|---|
| 2018/0349093 A1* | 12/2018 | McCarty | G10L 13/033 |
| 2019/0311718 A1* | 10/2019 | Huber | H04R 27/00 |
| 2020/0110577 A1* | 4/2020 | Rodgers | G10L 25/78 |
| 2020/0125317 A1* | 4/2020 | Sabin | H04R 1/406 |
| 2020/0174739 A1* | 6/2020 | Boss | H04M 3/568 |
| 2020/0183642 A1* | 6/2020 | Arachchi | H04W 4/06 |
| 2020/0379632 A1* | 12/2020 | Edwards | G06F 3/0482 |
| 2020/0401370 A1* | 12/2020 | Shetty | G10L 15/22 |
| 2022/0066731 A1 | 3/2022 | Schaer et al. | |

* cited by examiner

AUTOMATIC ADJUSTMENT OF MUTED RESPONSE SETTING

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., spoken utterances), which may in some cases be converted into text and then processed, and/or by providing textual (e.g., typed) natural language input (i.e., typed utterances). An automated assistant responds to a request by providing responsive user interface output, which can include audible and/or visual user interface output.

As mentioned above, many automated assistants are configured to be interacted with via spoken utterances. A user may submit queries and/or commands to an automated assistant interface of a client device via a spoken utterance, verbally indicating what information the user has interest in being provided and/or an action that the user has interest in being performed. Typically, the spoken utterance is detected by microphone(s) of the client device and captured as audio data. The client device may operate in a "speech recognition state" where for at least some time interval after invocation, the automated assistant performs speech-to-text ("STT") processing of audio data sampled by a microphone to generate textual input. The input in turn is semantically processed to determine a user's intent and to fulfill that intent. Fulfilling the intent can include determining an appropriate response, and causing the response to be rendered at the client device.

The response to a query may be presented to the user in either or both an audible and a visual format. For example, a smartphone may display text and images on its display in response to a particular query. Additionally or alternatively, the user device may use a speaker to present the user with an audible answer to their question in a digital voice. Under certain circumstances, a user expecting an audible response may instead receive only a visual response and/or an audible response may be provided for audible rendering, but not audibly perceived by the user. For instance, a user may unknowingly have an audio response setting of their phone set to a muted level, which can prevent the user from perceiving the audible response. As a result, the user can repeat the query in another attempt to receive an audible response. The repeated query must again be processed (e.g., STT, semantic understanding) and a response again generated. This can burden available hardware resources (e.g., battery, processing resources, memory resources) and, when data is transmitted between a client device and server in processing the query and/or in generating the response, can burden network resources.

SUMMARY

Some implementations disclosed herein relate to determining whether audible perception, of an audible response to a query (e.g., a voice query directed to an automated assistant), is critical to resolution of the query. Some of those implementations determine whether audible perception of the audible response to the query is critical based on one or more objective metrics generated based on historical analysis of past submission of that query (and/or of similar queries) and/or past instances of that response (and/or of similar responses). For example, a metric of a query can be generated based on a quantity of occurrences, across a population of users, of certain repeat submissions of that query (and/or similar queries) to an automated assistant. For instance, the certain repeat submissions can be those where: (a) an initial submission of the query was by a corresponding user and occurred when the response volume setting of a corresponding device that received the query and/or rendered (or at least attempted to render) the response was muted (e.g., less than a threshold, such as 25% of a maximum volume setting); and (b) a manual increase in the response volume setting (e.g., to non-muted) occurred between the initial submission and the repeat submission of the query by the corresponding user. Optionally, the repeat submissions can be restricted to those occurring within a threshold time (e.g., within 30 seconds of) a corresponding initial submission. Generally, the larger the quantity of repeat submissions, the more likely the query (and/or similar queries) will be found to be ones whose audible response is critical to resolution of the query.

Some implementations additionally or alternatively relate to, responsive to determining that audible perception of an audible response is critical, performing one or more operations to increase the likelihood that the audible response is audibly perceived in response to a submission of the query. As one example, the operation(s) can include fully automatically (i.e., without requiring any user input) adjusting the response volume setting of a device at which the query was submitted. For instance, the response volume setting of the device can be fully automatically adjusted responsive to the response volume setting being muted (e.g., less than a threshold, such as 30% of a maximum volume setting) and responsive to determining that audible perception of the audible response is critical. The automatic adjustment can be to a non-muted setting, such as to at least 50% of a maximum volume setting or to other adjusted non-muted setting. As another example, the operation(s) can include providing a visual prompt (e.g., a graphical element on a display) to recommend adjusting the volume, then automatically adjusting the volume responsive to affirmative user interface input provided responsive to the visual prompt (e.g., a touch of the graphical element on the display, or a spoken "yes" or "increase volume"). Optionally, the rendering of the audible response is postponed for at least a threshold duration of time and/or until the user has responded (affirmatively or negatively) to the visual prompt. This can prevent rendering of the audible response prior to the response volume setting being increased, mitigating necessitating repeating of the query to audible perceive the entirety of the audible response. In some implementations, whether a fully automatic adjustment or, instead, a visual prompt for adjustment is provided, can be based on a magnitude of a corresponding metric. For example, if the metric satisfies a first threshold but fails to satisfy a second threshold, a visual prompt for adjustment can be provided. However, if the metric satisfies both the first and second thresholds, a fully automatic adjustment can be performed. As yet another example, the operation(s) can include performing device arbitration to select a secondary device, determined to be farther away from the user than a primary device (but optionally within a threshold distance of the user), based on the secondary device being at a greater (e.g., non-muted) response volume setting than the primary device. Put another way, when it is determined that audible perception of an audible response is critical, a device for rendering the audible response can be selected from an ecosystem of available devices based at least in part on that device having a non-muted response volume setting.

In these and other manners, the objective metric can be utilized to mitigate occurrences of users not audibly perceiving audible responses when audible perception is deemed critical. This, in turn, can mitigate occurrences of repeat submissions of the query. By mitigating repeat submission of the query, overall duration of user-assistant dialogs is decreased. Moreover, computational and/or network resources are preserved by mitigating the repeat submission of the query. For example, for voice-based queries another occurrence of speech-to-text processing is mitigated, another occurrence of transmitting audio data (or transcribed text) to a server is mitigated, and/or another occurrence of transmitting and rendering a response to the query is mitigated. It is noted that, in various implementations, the objective metric is determined based on historical data as described herein. In some of those implementations, by determining whether to automatically adjust the response volume setting based on the objective metric, it is ensured that, at least over multiple queries from a plurality of users, occurrences of repeat submissions of a query are mitigated.

It is also noted that utilizing the objective metric can also prevent unnecessarily automatically adjusting the response volume setting when audible responses are not critical, thereby preventing a greater amount of power to be utilized in rendering the response at a higher volume. Further, in some implementations, when the objective metric indicates an audible response is not critical, a visual response is being provided, and a display for rendering the visual response is available, the audible response may not even be generated and/or transmitted for rendering—conserving computational and network resources.

As mentioned above, in various implementations the metric, utilized in determining whether audible perception of an audible response is critical, can be generated based on a quantity of occurrences of certain repeat submissions of that query. In some of those implementations, the metric can be based on the raw quantity of occurrences. For example, the metric can equal the raw quantity of occurrences in analyzed historical data. In some versions of those implementations, the raw quantity of occurrences can optionally be normalized utilizing one or more normalization techniques. For example, the raw quantity can be normalized based on an overall quantity of occurrences of the query (repeated or otherwise). For instance, the raw quantity can be divided by the overall quantity of occurrences, and the result utilized as the metric. In these and other manners, the quantity of certain repeat submissions of queries that are highly popular will need to be greater to find criticality as compared to the quantity of repeat submission of queries that are less popular. As another example of normalization, the raw quantity can be normalized based on an overall quantity of occurrences of repeats of the query (optionally within a threshold time period of one another), without an intervening manual increase in the response volume setting. In these and other manners, the quantity of certain repeat submissions of queries that are often repeated quickly (e.g., "how much time is left on the timer") will need to be greater to find criticality as compared to the quantity of repeat submission of queries that are not often repeated quickly (e.g., "when did California become a state").

Regardless of the technique(s) utilized to generate the metric(s), the metric(s) can be utilized in some implementations in determining whether an audible response to the query is critical. For example, queries whose metric(s) satisfy threshold(s) can be considered critical. In some implementations, the threshold for a metric is manually chosen. In some implementations, the threshold is chosen based on it being the mean, median, third quartile or other value of all generated metrics. It is noted that a metric can be associated with a single query or with multiple queries. When associated with multiple queries, the multiple queries can be represented as a regular expression, a query type, a query embedding, and/or other representation. For example, a metric can be generated based on analysis of historical repeat queries that conform to "what does a bad [automotive part] sound like?", where "[automotive part]" represents a plurality of disparate automotive parts, and can be assigned to "what does a bad [automotive part] sound like". As another example, a metric can be generated based on analysis of historical repeat queries that have corresponding query embeddings that are close to one another in embedding space, and can be assigned to those query embeddings or to an average of the query embeddings. The query embedding of a query can be generated by processing the query using a machine learning model such as, for example, a Word2Vec model.

It is noted that generating a metric for a query and/or utilizing the metric to determine whether an audible response to the query can include generating a metric for the audible response to the query. For example, the metric can be generated for an audible response based on a quantity of occurrences, across a population of users, of certain repeat provisions of that audible response (and/or similar responses) by an automated assistant. For instance, the certain repeat submissions can be those where: (a) an initial provision of the audible response was to a corresponding user and occurred when the response volume setting of a corresponding device that rendered (or at least attempted to render) the audible response was muted (e.g., less than a threshold, such as 25% of a maximum volume setting); and (b) a manual increase in the response volume setting (e.g., to non-muted) occurred between the initial provision of the audible response and the repeat provision of the audible response. Although this metric is generated based on responses, and can even be assigned to responses, it encompasses generating a metric for a query as that phrase is utilized herein. This is at least because determining whether an audible response to a query is critical can be made with reference to a determined response to the query.

In some implementations, generated metrics can be utilized to adapt the underlying content of audible responses. For example, responsive to the metric indicating audible perception of an audible response is critical, the audible response can be made to be more robust (i.e., include more content). On the other hand, responsive to the metric indicating audible perception of an audible response is not critical, the audible response can be abridged (i.e., include less content). For instance, if it is determined that audible perception of a given audible response that includes speech synthesis of text is not critical, the text can be shortened (e.g., using a text summarization algorithm) and speech synthesis of the shortened text provided in lieu of the speech synthesis of the non-abridged text. This can result in less data being transmitted (e.g., when the text and/or the synthesized speech is transmitted from a server to a client) and/or to a shorter duration of audio being rendered at a client device. In some implementations, where a query is for a third party agent (i.e., the third party agent generates the response to the query), metrics associated with the query can be provided to one or more parties associated with the third party agent. Providing such metrics can enable the third party agents to adapt the underlying content of the audible responses (e.g., as described above).

The above description is provided as an overview of only some implementations disclosed herein. Those and other implementations are described in more detail here.

In addition, some implementations include one or more processors of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
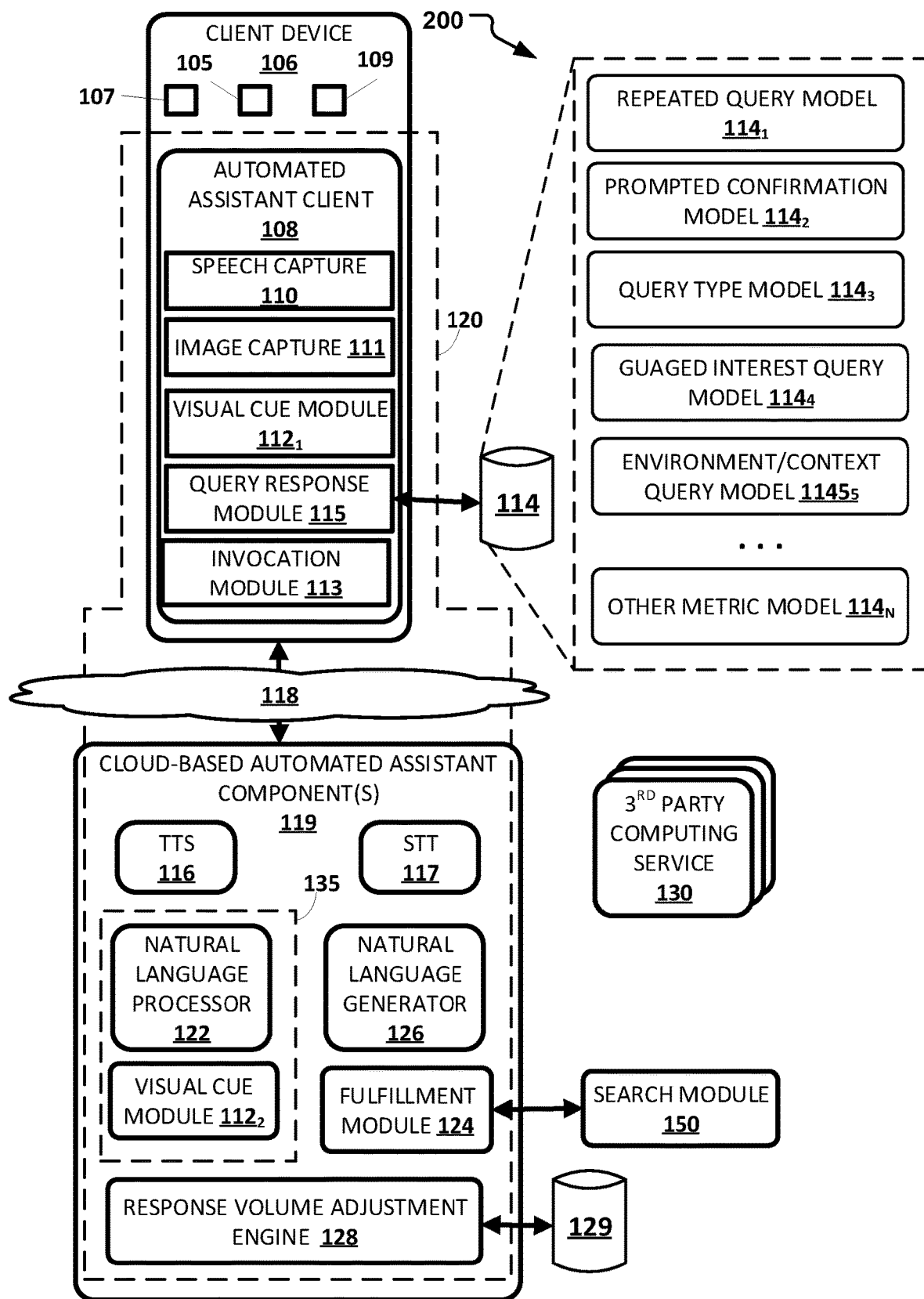
FIG. 1 is a block diagram of an example environment in which implementations disclosed herein may be implemented.

Techniques described herein enable an automatic adjustment of a muted response setting of an automated assistant based on a determination of an expectation by a user to hear an audible response to their query, despite the muted setting. Determination of the expectation may be based on historical, empirical data for multiple users over time for a given response scenario. For example, a system may determine from the historical data that a certain type of query has been associated with users both repeating their query and increasing a response volume setting within a given timeframe. Attributes may be generated, stored, and invoke response to metrics associated with identifiable types of queries and query scenarios. The metrics may include automated response characteristics meant to reduce inefficiencies associated with certain queries that can otherwise collectively burden network bandwidth and processing resources.

Based on the number and scenarios (e.g., user interactions) of compiled queries, different metric response characteristics may be established. For instance, in a scenario associated with a query where a high percentage of users manually increase the response volume setting, the response characteristic may call for the response volume setting to be automatically increased. Where a smaller number and/or percentage of users are present in the data, the response characteristic of the metric may cause an option to be displayed to the user, rather than automatically increasing the volume. For example, the metric may cause a phone to flash with a prompt to allow the system to increase the volume one time or to make automatic volume adjustments every time. Another response characteristic may include abridging an audible response. Still another response characteristic may include displaying the response on a screen of the computing device alone (e.g., with muted audio).

In one sense, a metric may be aligned with a measurement, such as what is being determined from data. For example, for a type of query, "what does a bad starter sound like," historical data may indicate a high quantity and/or percentage of occurrences of that being repeated with a volume increase in between. For example, a first example of a metric could be a raw number of occurrences, in historical data, of repeat of query (or queries that fall into query type within a preset amount seconds with an intervening volume increase. A second example of a metric may include the result of the first example divided by: a raw number of occurrences in historical data and of repeats of query (or queries that fall into query type) within a present window of time without an intervening volume increase. In this second example, the denominator may help normalize for queries that just so happen to be repeated often within short time period. A third, non-exhaustive example may include a raw number of the result of the first example divided by a raw number of occurrences of query (or queries that fall into a query type) overall (e.g., repeated query or not). The denominator in this third example may help normalize for popular queries. The three types of queries are illustrative only and could be combined as to achieve different results.

Examples of attributes may include the subject matter of the query, as well as circumstances pertaining to the time and surrounding of the queries. Attributes may be datapoints useful in identifying searchable commonalities within a group of queries that are useful in associating the grouping with one or more metrics. The common attributes may themselves be factors that lend insight and context to the queries The types of query attributes to be matched with metrics may comprise an inexhaustive list that grows in step with the popularity of digital assistants. Examples of query types may include types where queries are repeated within a timeframe or a user has indicated a desire to override a muted volume setting. Another type may regard a query best answered using an audible response because sound is integral to understanding the content. Query types may also be differentiated by environmental and contextual factors, such as any sounds picked up near the user and the proximity of the user to the assistant. Other factors may include whether the user spoke or typed their query, and if the user is known to be in a meeting from their daily digital calendar data.

An implementation of the system may filter out data indicative of instances of repeated queries within the window of time, but where no volume increases were recorded. This normalization may function to remove false positives that could skew the data and result in the inclusion of ineffective attributes. Additionally, some metrics may be structurally rigid while others may abstracted out to increase the volume of response scenarios potentially linked to the metric, further reducing network traffic and processing. For example, a grouping of queries requesting a pronunciation of a particular word may be expanded to include a larger grouping regarding pronunciation of all words in general.

While not every individual user scenario will be better served by the generated metric, the experience will become more efficient for a statistical majority of users. This efficiency may be realized on a collective basis across a plurality of users to reduce network traffic and processing requirements.

When a user provides a voice query to a digital assistant and a mobile device is in a low volume (muted) state, the digital assistant may attempt to statistically follow an anticipated desire (e.g., using historical data) of using a metric. According to one implementation, a metric is calculated based on muted queries followed by unmuting, repeating the query within a short time interval, and a total number of the muted queries. According to another implementation, the system may determine an important feature that requires audio feedback from the digital assistant using the metric. Analysis may show that the metric gives a clear separation among features. The features with highest numbers show a strong correlation with the ones where audio feedback conceptually seems most important, such as asking the assistant to sing or count.

An implementation may enable audio feedback for each feature to desired features to maximize user benefit. The digital assistant of an example stores historical information such as: User ID (or hash), query (or hash), muted status (volume for extension), and a timestamp to determine the important features.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 118.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used, e.g., by an image capture module 111, to capture image frames (still images or video) of an environment in which client device 106 is deployed. These image frames may then be analyzed, e.g., by a visual cue module $112_1$, to detect user-provided visual cues contained in the image frames. These visual cues may include but are not limited to hand gestures, gazes towards particular reference points, facial expressions, predefined movements by users, etc. These detected visual cues may be used for various purposes, such as invoking automated assistant 120 and/or causing automated assistant 120 to take various actions.

Additionally or alternatively, in some implementations, client device 106 may include one or more proximity sensors 105. Proximity sensor(s) may take various forms, such as passive infrared ("PIR") sensors, radio frequency identification ("RFID"), a component that receives a signal emitted from another nearby electronic component (e.g., Bluetooth signal from a nearby user's client device, high- or low-frequency sounds emitted from the devices, etc.), and so forth. Additionally or alternatively, vision sensors 107 and/or a microphone 109 may also be used as proximity sensors, e.g., by visual and/or audibly detecting that a user is proximate.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant," to cause automated assistant 120 to begin actively listening or monitoring typed text. Additionally or alternatively, in some implementations, automated assistant 120 may be invoked based on one or more detected visual cues, alone or in combination with oral invocation phrases.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110, the aforementioned image capture module 111, a visual cue module 112$_1$, and/or an invocation module 113. In other implementations, one or more aspects of speech capture module 110, image capture module 111, visual cue module 112, and/or invocation module 113 may be implemented separately from automated assistant client 108, e.g., by one or more cloud-based automated assistant components 119. For example, in FIG. 1, there is also a cloud-based visual cue module 112$_2$ that may detect visual cues in image data.

In various implementations, speech capture module 110, which may be implemented using any combination of hardware and software, may interface with hardware such as a microphone 109 or other pressure sensor to capture an audio recording of a user's utterance(s). Various types of processing may be performed on this audio recording for various purposes. In some implementations, image capture module 111, which may be implemented using any combination of hardware or software, may be configured to interface with camera 107 to capture one or more image frames (e.g., digital photographs) that correspond to a field of view of the vision sensor 107.

In various implementations, visual cue module 112$_1$ (and/or cloud-based visual cue module 112$_2$) may be implemented using any combination of hardware or software, and may be configured to analyze one or more image frames provided by image capture module 111 to detect one or more visual cues captured in and/or across the one or more image frames. Visual cue module 112$_1$ may employ a variety of techniques to detect visual cues. For example, Visual cue module 112$_2$ may use one or more artificial intelligence (or machine learning) models that are trained to generate output indicative of detected user-provided visual cues in image frames.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques. Additionally or alternatively, in some implementations, speech capture module 110 may be configured to convert text to computer-synthesized speech, e.g., using one or more voice synthesizers. However, in some cases, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based text-to-speech ("TTS") module 116 and/or a cloud-based STT module 117.

In various implementations, invocation module 113 may be configured to determine whether to invoke automated assistant 120, e.g., based on output provided by speech capture module 110 and/or visual cue module 112$_1$ (which in some implementations may be combined with image capture module 111 in a single module). For example, invocation module 113 may determine whether a user's utterance qualifies as an invocation phrase that should initiate a human-to-computer dialog session with automated assistant 120. In some implementations, invocation module 113 may analyze data indicative of the user's utterance, such as an audio recording or a vector of features extracted from the audio recording (e.g., an embedding), alone or in conjunction with one or more visual cues detected by visual cue module 112$_1$. In some implementations, a threshold that is employed by invocation module 113 to determine whether to invoke automated assistant 120 in response to a vocal utterance may be lowered when particular visual cues are also detected. Consequently, even when a user provides a vocal utterance that is different from but somewhat phonetically similar to the proper invocation phrase, "OK assistant," that utterance may nonetheless be accepted as a proper invocation when detected in conjunction with a visual cue (e.g., hand waving by the speaker, speaker gazes directly into vision sensor 107, etc.).

According to some implementations, a query response module 115 is configured to access one or more on-device volume adjustment response models, e.g., stored in an on-device model database 114. The query response module 115 may work independently or in concert with the response volume adjustment engine 128 of the cloud based component 119 to determine whether to override a muted setting of response volume setting to provide an audible response to the user.

In some implementations, a default on-device invocation model 113 may be trained to detect, in an audio recording or other data indicative thereof, one or more default invocation phrases or hot words (e.g., "OK Assistant," "Hey, Assistant," etc.). In some such implementations, these models may always be available and usable to transition automated assistant 120 into a general listening state in which any audio recording captured by speech capture module 110 (at least for some period of time following invocation) may be processed using other components of automated assistant 120 as described below (e.g., on client device 106 or by one or more cloud-based automated assistant components 119).

In FIG. 1, on-device model database 114 may store one or more on-device models $114_1$-$114_N$. Additionally, in some implementations, on-device model database 114 may store, at least temporarily, one or more additional metric models and associated response characteristics $114_1$-$114_N$. These metric models $114_1$-$114_N$ may be used by and/or available to (e.g., activated by) query response module 115 in specific contexts. The query response module 115 may be configured in a particular implementation to initiate an action according to a queued metric model. Illustrative such actions may include increasing or decreasing the response volume setting. Other actions may include providing an abridged audible response and contacting a third party provider 130 for additional information or to provide feedback. Other examples of actions may include providing only a visual response, or providing a combination of a visual and an audible response.

Illustrative metric models $114_1$-$114_N$ shown in FIG. 1 include a repeated query model $114_1$ that may be invoked in response to repeated queries within a timeframe. A prompted confirmation model $114_2$ may be used when a query prompts the system 100 to cause the user to confirm a desire to receive an audible response. A query type model $114_3$ may be used when the inherent nature of the content of the query has historically been or will logically be best answered using an audible response because sound is integral to understanding the content. A gauged interest query model $114_4$ may address types of occurrences where users have historically shown varied amounts of interest. For example, certain users and circumstances may suggest a more through or brief response. An environmental and context query model $114_5$ may take external factors into account, such as any sounds picked up near the user and the proximity of the user to the assistant. Other factors may include whether the user spoke or typed their query, and if the user is known to be in a meeting from their daily digital calendar data.

Metric models $114_1$-$114_N$ may be trained to detect, e.g., in an audio recording or other data indicative thereof, one or more context-specific hot words. In some implementations, metric models $114_1$-$114_N$ may be selectively downloaded on an as-needed basis, e.g., from a response volume adjustment engine 128 that forms part of cloud-based automated assistant components 119, as will be described in more detail below.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

An intent matcher 135 may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122 and the aforementioned cloud-based visual cue module $112_2$. In various implementations, cloud-based visual cue module $112_2$ may operate similarly to visual cue module $112_1$ except that cloud-based visual cue module $112_2$ may have more resources at its disposal. In particular, cloud-based visual cue module $112_2$ may detect visual cues that may be used by intent matcher 135, alone or in combination with other signals, to determine a user's intent.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from visual cue module (e.g., $112_1$ and/or $112_2$). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?"

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected by visual cue modules $112_{1-2}$. For example, a user could utter something like "Order me this many cat bowls" while holding up three fingers to visual sensor 107 of client device 106. Or, a user could utter something like "Find me more movies like this" while holding of a DVD case for a particular movie.

In some implementations, automated assistant 120 may serve as an intermediary between users and one or more third party computing services 130 (or "third party agents", or "agents"). These third party computing services 130 may be independent software processes that receive input and provide responsive output. Some third party computing services may take the form of third party applications that may or may not operate on computing systems that are separate from those that operate, for instance, cloud-based automated assistant components 119. One kind of user intent that may be identified by intent matcher 135 is to engage a third party computing service 130. For example, automated assistant 120 may provide access to an application programming interface ("API") to a service for controlling a smart device. A user may invoke automated assistant 120 and provide a command such as "I'd like to turn the heating on." Intent matcher 135 may map this command to a grammar that triggers automated assistant 120 to engage with the third party service 130, thereby to cause the user's heating to be switched on. The third party service 130 may provide automated assistant 120 with a minimum list of slots that need to be filled in order to fulfill (or "resolve") a command to turn the heating on. In this example, the slots may include the temperature to which the heating is to be set, and a duration for which the heating is to be on. The third party service 130 may provide other information, including data useful in generating visual and audible responses to user queries. Automated assistant 120 may generate and provide to the user (via client device 106) natural language output that solicits parameters for the slots.

Fulfillment module 124 may be configured to receive the predicted/estimated intent that is output by intent matcher 135, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some FIGS. 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

While implementations described herein have been focused on causing automated assistant 120 to take various actions (e.g., search for information, control media playback, stop a timer, etc.) in response to context-specific hot words, this is not meant to be limiting. Techniques described herein may be extended to other use cases. For example, techniques described herein may be applicable when a user wishes to fill in a form field, e.g., on a search web page. In some implementations, when a search bar or other similar textual input element is present in a web page, one or more additional context-specific hot words may be activated. For example, when a user navigates an assistant-enabled device to a web page having a search bar, the hot words "search for" may be activated, e.g., so that the user can simply say "search for <desired topic>" and the user's utterance following "search for" can be transcribed into the search bar automatically, without the user needing to invoke automated assistant 120 first.

In various implementations, transition of a computing device into a particular context may activate, in addition to or instead of one or more context-specific hot words, one or more context-specific gestures. For example, suppose a user is detected with a particular proximity of an assistant device. In some implementations, one or more context-specific gestures may be activated. Detection of those gestures, e.g., by invocation module 113, may trigger transition of automated assistant 120 into the general listening state and/or cause automated assistant 120 to perform some context-specific responsive action.

Figure 2:
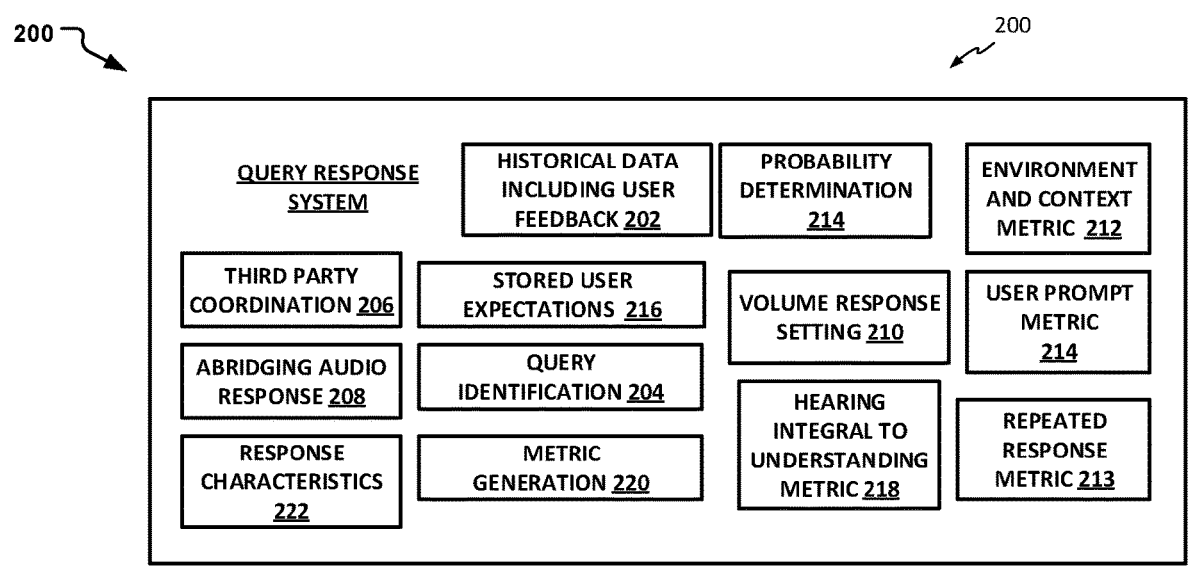
FIG. 2 is a block diagram of an implementation of a system configured to adjust a muted response setting of an automated assistant based on a determination of an expectation by a user to hear an audible response to their query, despite the muted setting.

FIG. 2 is a block diagram of an implementation of a system 200 configured to adjust a muted response setting of an automated assistant based on a determination of an expectation by a user to hear an audible response to their query, despite the muted setting. The illustrative system 200 of FIG. 2 may be similar to either of the query response module 115 of response volume adjustment engine 128 of FIG. 1.

The implementation of the system 200 includes multiple modules 202, 204, 206, 208, 210, 212, 213, 214, 216, 218, 220, 222, 224 to illustrate different features useful in generating and deploying metrics to automatically identify and respond to facilitate efficiently answering queries. For example, historical data 202 pertaining to queries from multiple users may, with permissions from the multiple users, be accumulated, stored and accessed. The historical data 202 may include user feedback, such as times a user repeated a query. A query identification module 204 may be used to identify types of queries and scenarios for use in associating the query with an appropriate metric. According to one implementation, the query identification module 204 may parse attributes from queries to locate matches linking the query to a metric.

Illustrative such metrics may include a repeated response metric 213 and a user prompt metric 214. The repeated response metric 213 of an implementation may cause the system to adjust (e.g., increase) a volume response setting 210 based on receiving one or more user queries. The prompt metric 214 may initiate prompting the user for confirmation of a desire to receive an audible response. A hearing integral to understanding type of metric 218 may be identified by virtue of hearing being conceptually integral to understanding a response to the query. For example, one such query may include, "what sound does a car make that has failed starter?". Environmental and contextual considerations may be taken into account by a module 214 as described herein.

Metrics may be generated by a metric generation module 220 using stored user expectations 216 and a probability of a metric applying to a query may be determined and assigned at module 214. The probability or percentage may be weighted when factored in with other considerations from other modules.

A response characteristics module 222 may be assigned to or adjusted for a metric. For example, a response characteristic may adjust (i.e., increase or decrease the response volume setting via module 210. Other illustrative response characteristics further include generating an abridged or non-abridged audible response generated using module 208. Other examples of response characteristics may include a visual only response, or a visual and audible response to a future, similar query.

A third party module 206 may be used to provide feedback to a third party, such as the third party service 130 in FIG. 1. The system 200 may provide the feedback based on information provided to the user in response to a query that concerned the third party. For instance, a user may have inquired about a menu item associated with a third party restaurant reservation service. The system 200 may provide feedback to the third party restaurant service as to whether the information made available by the third party was adequate to form an audible response that satisfied the query of the user.

Figure 3:
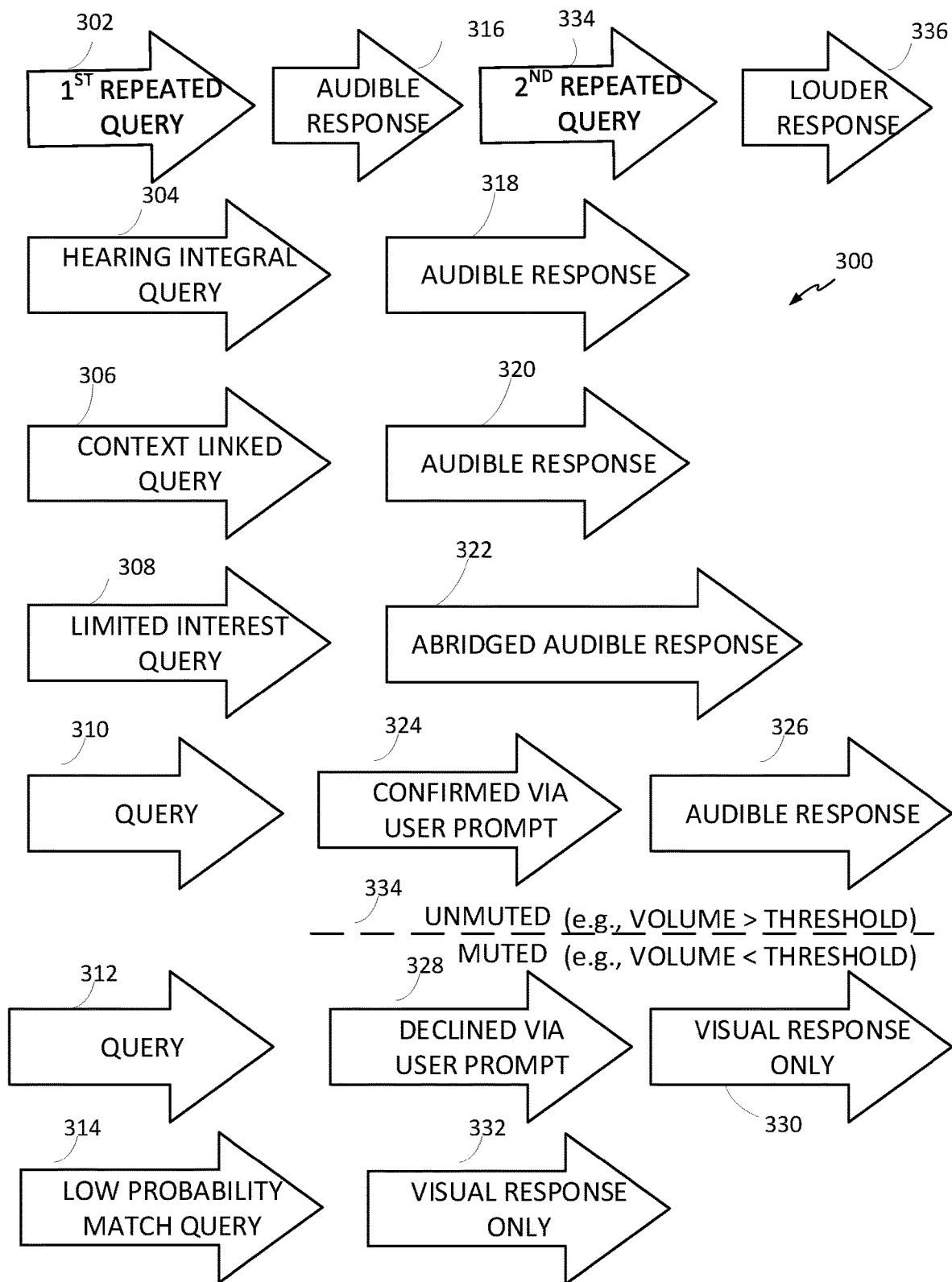
FIG. 3 is a block diagram visually illustrating a series of sequences associated with various responses to user queries according to a particular implementation where a response volume setting may be automatically increased or remain relatively muted.

FIG. 3 is a block diagram visually illustrating a series of sequences associated with various responses to user queries according to a particular implementation where a response volume setting may be automatically increased or remain relatively muted. A dashed line 334 demarcates muted versus unmuted responses. As described herein, a muted response may be an audible response having a volume that is below that of a predetermined threshold. In the diagram shown in FIG. 3, the initial queries 302, 304, 306, 308, 310, 312, 314 of each sequence may be initiated when the response volume setting is muted.

In one example, a sequence beginning with a first repeated query 302 may be detected by either system 100, 200 shown in FIGS. 1 and 2, respectively. The query 302 may be a second attempt of an original query by a user made within a preset period of time. In response to the repeated query 302, the system may generate an audible response 316. As shown in the scenario of FIG. 3, a second repeated query 334 may be detected. In response, the system may increase the response volume setting to generate a louder response 336 meant to satisfy the query of the user.

In another example, a query 304 may be received that is of a type where hearing an audible answer may be particularly helpful in understanding a response to the query. Where identified as being such by the system, an audible response 318 may be immediately generated to attempt to satisfy the query of the user.

Similarly, a query 306 may include attributes known by the system to be associated via context or environment with a given metric. As such, the appropriate metric may be invoked to generate an audible response 320 to answer the query 306.

Another sequence begins with a query 308 having attributes recognized by the system to be associated with a desire of a user to receive a condensed, or abridged, audible version of content available to answer the query. The abridged response 322 may be automatically generated without the user having send multiple requests.

A query 310 may cause the system to prompt a user as to whether or not they desire an audible response. For example, a popup window on a display of the user may ask them to accept or decline an invitation to receive an audible response. The prompt may cause the user to send a response 324 accepting the offer and resulting in an audible response 326.

Another query 312 may initiate a similar prompt that may alternatively be declined 328 by a user. As result, the user may receive a visual response 332 without any audio.

Another query 314 shown in FIG. 1 may have no attributes that immediately may be associated with a stored metric. As such, the initial muted setting for the response volume setting may cause only a visual response 332 to be received in response to the query of the user.

In an implementation, a volume setting of a digital assistant may equal a volume setting of the computing device (e.g., for stand-alone speaker there may be a single volume). A volume setting of a digital assistant could be one of multiple independently adjustable volume settings of the computing device (e.g., a smart phone may have an assistant volume setting, separate ringer volume setting, and separate call volume setting, etc.).

Figure 4:
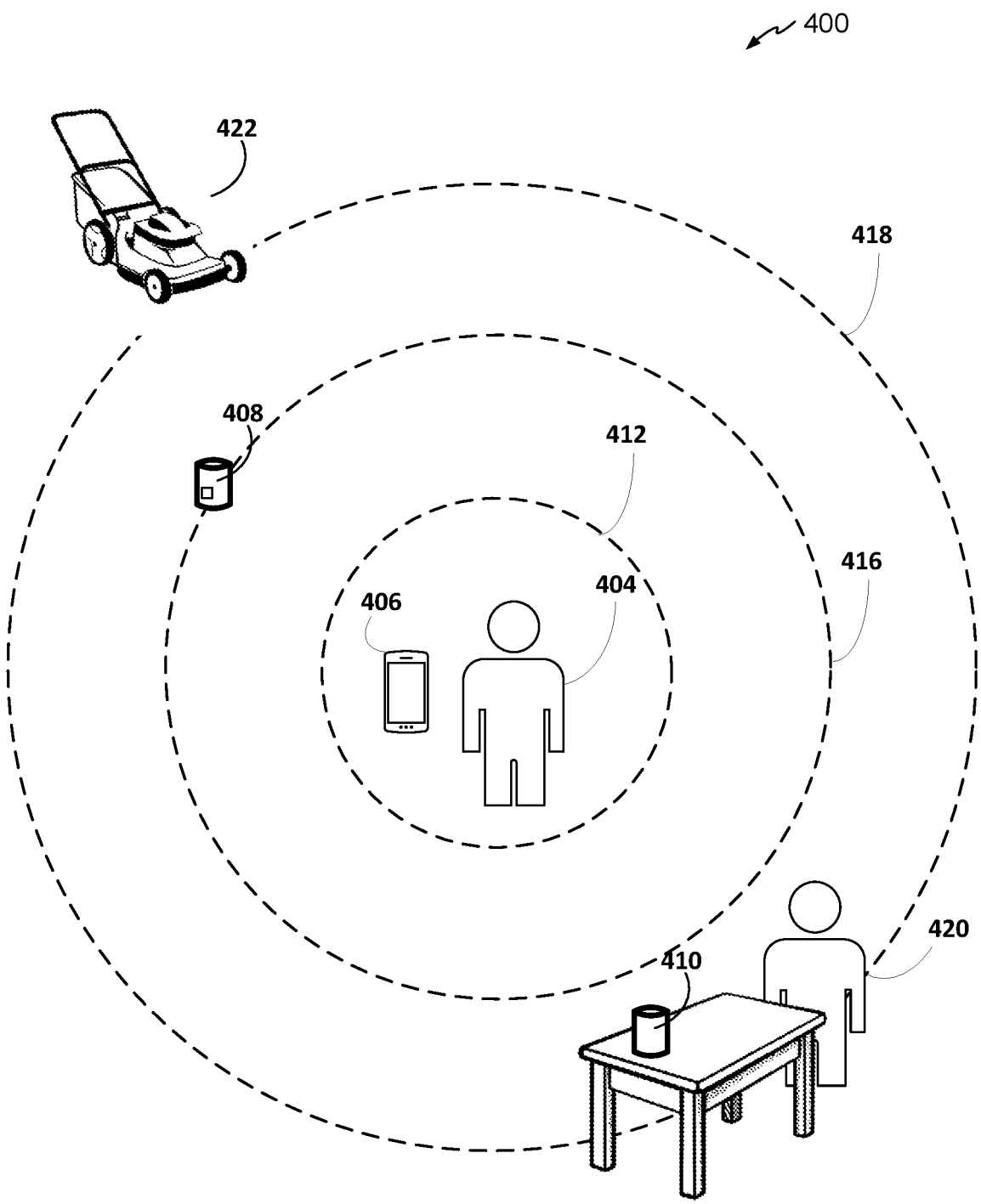
FIG. 4 is a diagram depicting a system including an environment that includes multiple digital assistants capable of delivering an audible response to a user in response to a query according to a particular implementation.

FIG. 4 is a diagram depicting a system 400 including an environment that includes multiple digital assistants capable of delivering an audible response to a user in response to a query according to a particular implementation. As depicted in FIG. 4, a user 404 may have spoken or otherwise submitted a query. The query may have been depicted by one or more digital assistants 406, 408, 410. Concentric dashed circles 412, 416, 420 may represent relative distances of the digital assistants 406, 408, 410 from the user 404.

According to one scenario, the system 400 may determine that the user should receive an audible response from the digital assistant 406 having the closest proximity to the user 404. The digital assistant in the scenario may or may not have been the same digital assistant that received the query from the user.

In another scenario, the digital assistant 406 may be the closest and typically most desirable to provide an audible response. However, the system may determine that the particular query response is associated with metric that indicates a high desirability for an audible response, and that the digital assistant 406 is muted (e.g., fully muted or set at a really low volume). As a result, the system may choose another, more distant device that is not muted, such as digital assistant 408 or 410. As such, techniques described herein may be used to determine, based on one or more metric(s), that a response should be delivered audibly. If a closest device to user is muted, the system may automatically override (or prompt the user manually override or allow for an automatic override). Alternatively, the system may determine that another device is "close enough" and is "not muted," and may thus render the audible response at that other device without necessitating automatically overriding the initial selection based on proximity.

In another implementation, the system 400 may determine that the user 404 is typing or watching a movie using the closest digital assistant 406. As a consequence, the system 400 may determine that the audible response may be delivered with the least disruption to the user 404 via the next closest digital assistant 408.

According to another scenario, the system 400 may have initially determined that the digital assistant 408 is a preferred candidate for generating an audible response. However, a loud noise, such as produced by a lawnmower 422, may arise near the digital assistant 408. In response, the system 400 may transition the audio response from the digital assistant 408 to one or more of the other digital assistants 408, 410.

In another implementation, a digital assistant 406 may be the most appropriate automatic selection from which the user 404 could hear a response to a query. However, the user 404 may indicate that they want their friend 420 to receive the audible response. As such, the system 400 may direct the response to the query to be generated at the digital assistant 410 proximate the friend 420.

Figure 5:
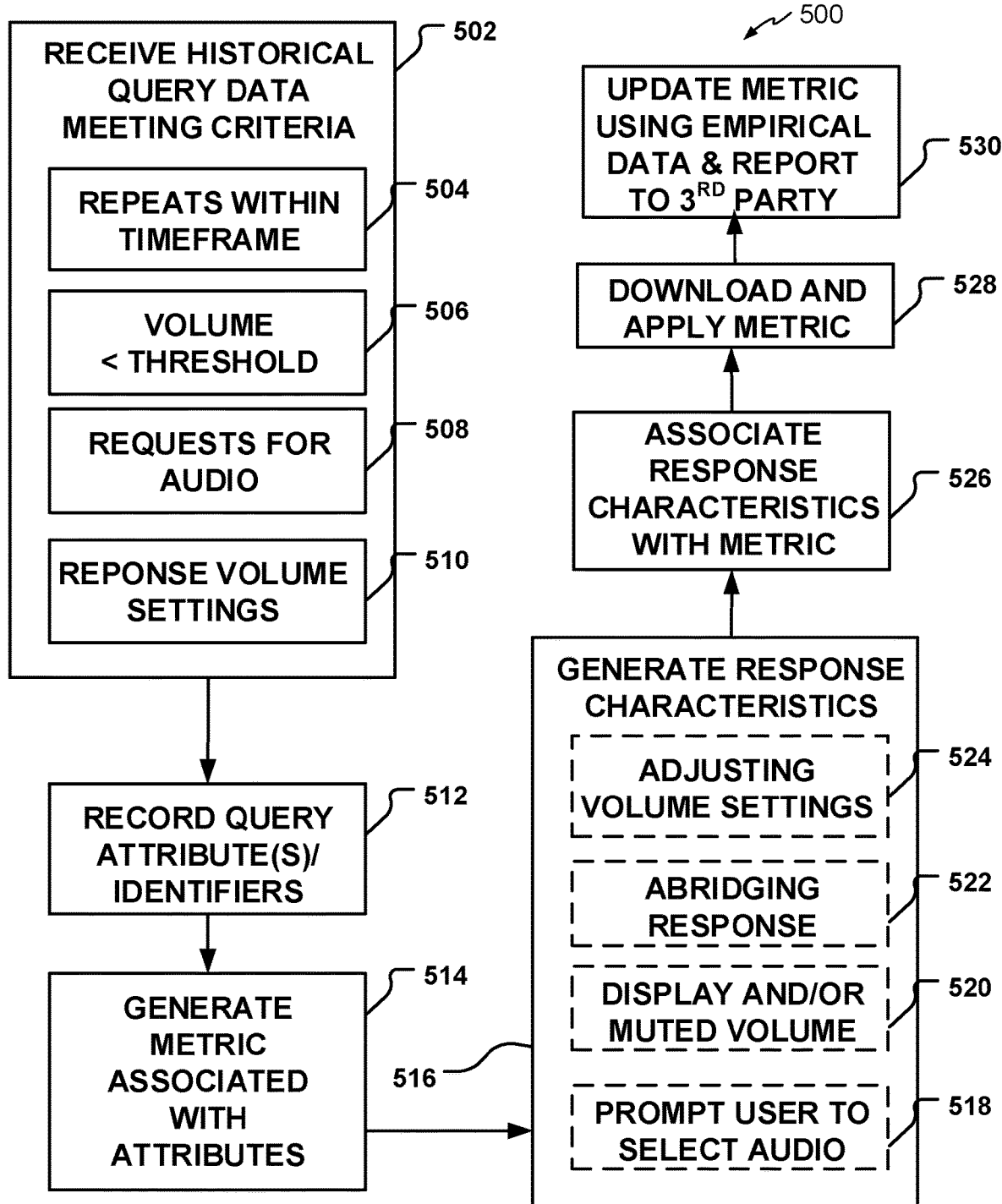
FIG. 5 is flowchart of an example of a method as could be executed by the illustrative systems of FIG. 1 or 2, respectively, to generate a metric.

FIG. 5 is flowchart of an example of a method as could be executed by the illustrative systems 100, 200 of FIG. 1 or 2, respectively, to generate a metric. The metric may be used alone or in combination with other metrics to anticipate, based on a query, whether a user has an expectation for an audible response, despite the having a response volume setting at a low level (e.g., less than threshold) or otherwise muted state to reduce redundant queries that can burden network bandwidth and processing resources. For convenience, the operations of the flowchart may at times be described with reference to a system (e.g., FIG. 1 or 2) that performs the operations. This system may include various components of various computer systems. Moreover, while operations of method 500 are shown in a particular order, this is not meant to be limiting. FIG. 5 includes dashed lines around some illustrative processes that may be optional in certain implementations. However, as also with the other flowcharts included herein, one or more operations may be reordered, omitted or added, and combined with operations of the other included flowcharts.

Turning more particularly to the operations of the flowchart at 502, an implementation of the method 500 may include receiving historical query data meeting criteria of interest. For example, an implementation may retrieve all instances of users repeating a query 504 within a given timeframe 506, and where there was an increase in a response volume setting 510 of some preset percentage in between query attempts.

Though not shown in FIG. 5, historical data at 502 may also include criteria configured to filter attribute results. For example, the system may additionally focus and discard data indicative of instances of repeated queries within the window of time, but where no volume increases were recorded. This filtering may function to remove false positives that could skew the data and result in the inclusion of ineffective attributes.

Some attributes may be structurally rigid while others may abstracted out. For instance, a relatively rigid query attribute may pertain to the biography novelist. In another instance, a type of query attribute relating to the how to pronounce a word in the Lithuanian language may extend to other queries asking for foreign pronunciations. An implementation of such automatic abstractions and extrapolations may be accomplished using artificial intelligence to increase the volume of response scenarios potentially linked to the metric, further reducing network traffic and processing.

The method 500 may include recording at 512 attributes regarding the received queries. Examples of attributes may include the subject matter of the query, as well as circumstances pertaining to the time and surrounding of the queries. Attributes may be datapoints useful in identifying searchable commonalities within a group of queries that are useful in associating the grouping with one or more metrics. The common attributes may themselves be factors that lend insight and context to the queries.

The repeated queries at 504 may include similar or the same content as the original query. As explained herein, the repeated query may have been repeated within a given time window. For instance, the repeated query may be repeated within 30 seconds of the original query. The number of implementations occurring within the timeframe may also be reported and stored.

The queries may have been initially attempted when a response volume level is muted, or less than a muted threshold 506. For instance, an illustrative muted threshold may be some setting softer than at full volume, and more likely around 0% to 30% of a maximum volume.

An implementation of the method 500 may include data pertaining to queries that additionally resulted in an increase of the response volume setting 510 within a time period. The increase may have been incremental or executed according to some other preset protocol, such as adjusting the volume up to a full level. As described herein, an incremental adjustment may be increased in step with a number of repeated responses or other indications that the current muted setting is not loud enough for the user to hear.

The method 500 may include generating at 514 a metric associated with the attributes of the query. As described herein, the generated metric may be stored in such a manner that attributes of the metric may be matched to incoming queries to facilitate future responses with fewer repeated or otherwise unsuccessful attempts that could drain processing resources.

Response characteristics for the metric may be generated and stored at 516. Based on the number and results of compiled queries, different metric response characteristics may be established. For instance, in a scenario associated with a query where a high percentage of thousands or millions of users manually increase the response volume setting, the response characteristic may call for the response volume setting to be automatically increased. Where a smaller number of users and percentages are present in the data, the response characteristic of the metric may cause an option to be displayed to the user, rather than automatically increasing the volume. For example, the metric may cause a phone to flash with a prompt at 518 to allow the system to increase the volume one time or to make automatic volume adjustments every time. Illustrative response characteristics may include adjusting the response volume setting at 524. The adjusted response volume settings at 524 may be used to anticipate volume settings of a future responses according to the associated metric.

Another response characteristic may include abridging an audible response at 522. Still another illustrative response characteristics may include prompting a user to confirm an audible response is desired at 518. At 520, the response characteristic may include displaying the response on a screen of the computing device alone (e.g., with muted audio). In operation, a particular metric would likely invoke only one or two such response characteristic, and the response characteristics 518, 520, 522, 524 are shown for illustrative purposes to provide different, non-exhaustive examples of different response characteristics.

At 526, the response characteristics may be associated with the metric. In this manner, the metric may be invoked when it is matched to an incoming query, and the associated response characteristic(s) may be available to immediately resolve a query from a user.

The metric may be downloaded and applied at 528 at a local digital assistant. The metric may anticipate the audible response needs of the user. The anticipation may more quickly arrive the desired response for the user, thus sparing them the frustration of repeating their query. On a larger scale, the anticipation features may collectively spare significant network bandwidth and processing resources.

At 530, the metric may be updated using incoming data. Adapting, or framing, the metric may include adapting one more response characteristics of the metric. As explained herein, illustrative response characteristics may include adjusting (i.e., increasing or decreasing the response volume setting). Other examples of response characteristics further include generating an abridged or non-abridged audible response, a visual only response, or a visual and audible response to a future, similar query.

According to a particular implementation, data may be reported to a third party provider. For instance, a user may have inquired about a property for rent that is associated with a third party rental service. An implementation of the method 500 may provide the third party with accumulated data regarding queries by users that relate to their rental properties. For instance, a large number of users may have requested information about a rental in an audio format. The system may thus provide feedback to the third party rental service as to whether the information made available by the third party was adequate to form an audible response that satisfied the query of the user.

Figure 6:
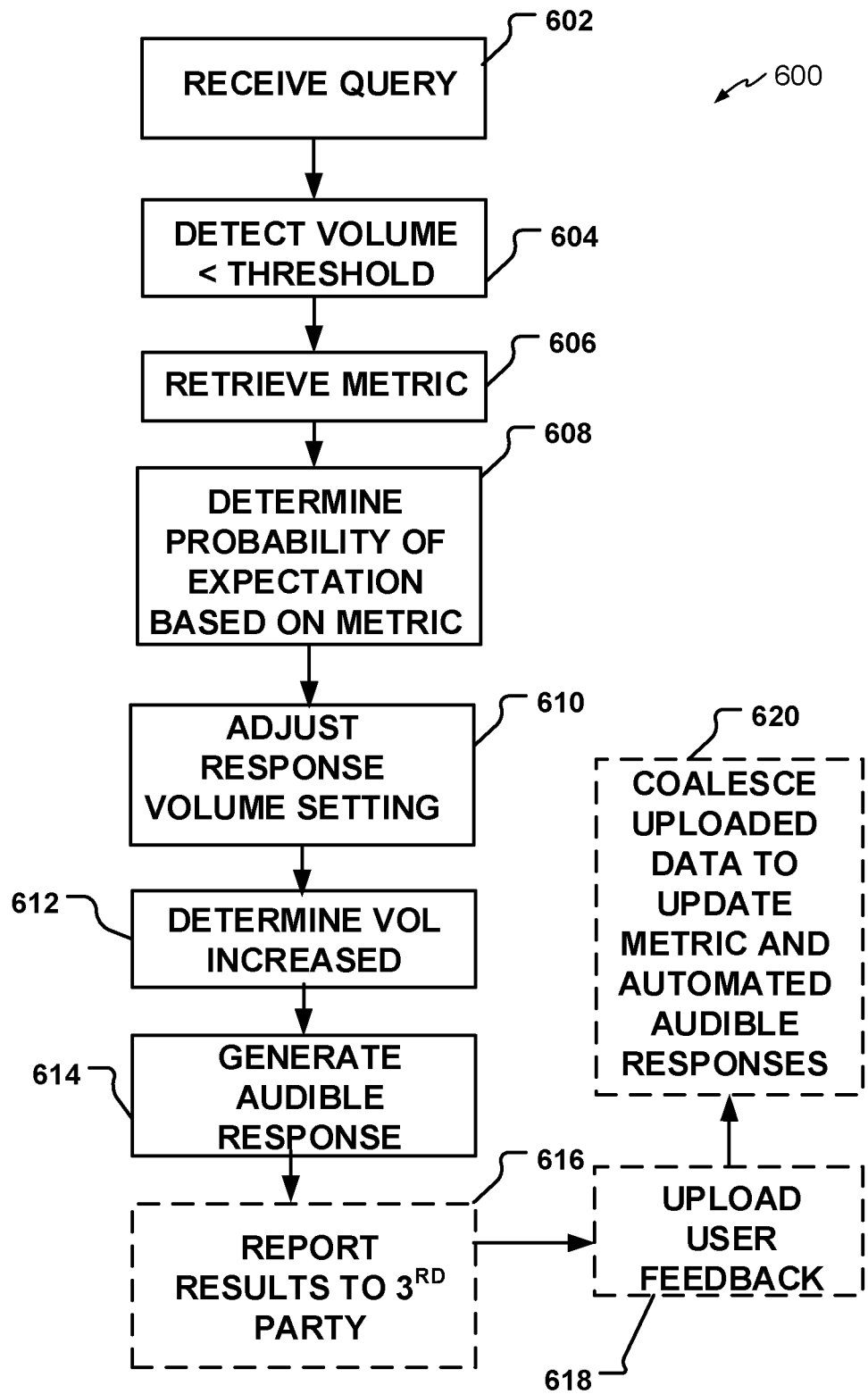
FIG. 6 is a flowchart illustrating an example method according to implementations disclosed herein.

FIG. 6 is a flowchart illustrating an example method 600 according to implementations disclosed herein. For convenience, the operations of the flowchart are described with reference to a system that performs the operations. This system may include various components of various computer systems, such as one or more components of automated assistant 120. Moreover, while operations of method 600 are shown in a particular order, this is not meant to be limiting. While dashed lines are include in FIG. 6 to denote optional processes, one or more of other operations may be reordered, omitted or added.

At block 602, an implementation of the method 600 may include receiving a spoken, typed, or visual query from a user. Receiving the query may include processes to determine attributes regarding the received query to be used to logically link the query to a historically established metric. Examples of attributes may include: a topic, a detected activity of the user at the time, a muted setting, a repeat effort, as well as whether the query was spoken or the user prompted.

At 604, the system may determine whether the volume setting for response has been set at a volume level that is less than some muted threshold. For instance, an illustrative muted threshold may be some setting softer than at full volume, and more likely around 5% to 30% of maximum volume.

Having established the presence of the muted setting at 604 and derived one more attributes from the query at 602, the method 600 may retrieve a metric best matched with the attribute(s) at 606. The metric may be associated with the query based on an assigned probability. In one example, the metric may be used at 608 to determine a probability that the user desires or otherwise expects to receive an audible response.

An implementation of the method 600 at 608 may increase or otherwise adjust the volume of the response volume setting at 610. An increase may be incremental or made according to some other preset protocol, such as adjusting the volume up to a level loud enough for the user to hear.

The increased volume setting of the response level may be recorded at 612. The recorded volume setting may be used as a baseline to further adjust the volume setting, as well as to anticipate a volume setting of a future response according to an associated metric. The system performing the method 600 may provide an audible response to the user at 614 at the adjusted volume setting.

The results or other feedback of the response scenario may be provided at 616 to a third party, such as the third party service 130 in FIG. 1. The method 600 may provide the feedback based on information provided to the user in response to a query that concerned the third party. For instance, a user may have inquired about a repair cost associated with a third party plumbing service. The system may provide feedback to the third party restaurant service as to whether the information made available by the third party was adequate to form an audible response that satisfied the query of the user.

User feedback may be uploaded at 618 to a server managing the invoked metric. For instance, a user may indicate that the response was helpful (e.g., by not repeating the query) or may indicate that the query didn't fully answer their question (e.g., by submitting another query). Results and feedback may be coalesced at 620 to update the applicable metric for a next occurrence and automated audible response.

Figure 7:
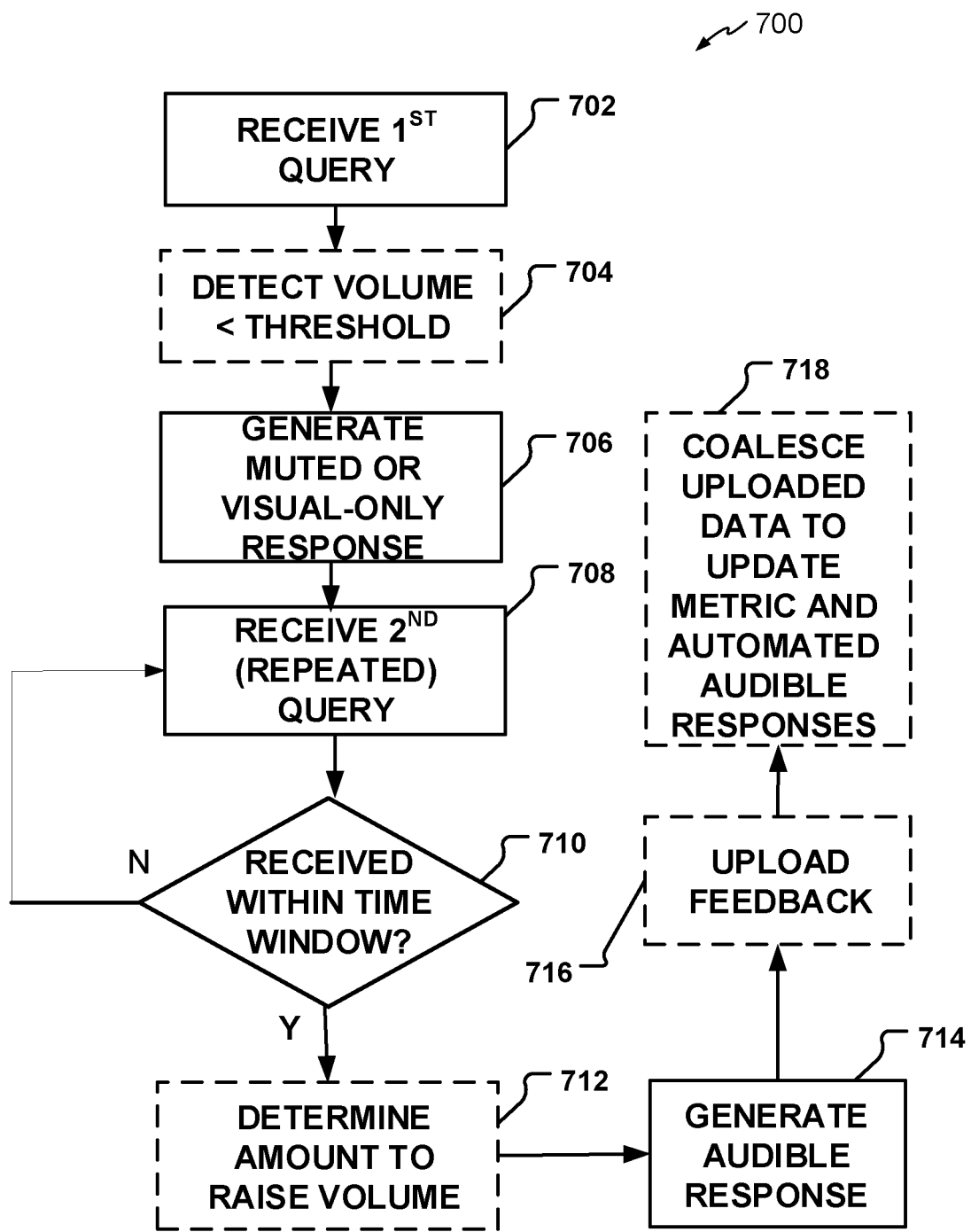
FIG. 7 is a flowchart illustrating an example method according to implementations disclosed herein as they may pertain to repeated queries.

FIG. 7 is a flowchart illustrating an example method 700 according to implementations disclosed herein. More particularly, the method 700 includes processes consistent with a metric pertaining to repeated queries. For convenience, the operations of the flowchart are described with reference to a system that performs the operations. This system may include various components of various computer systems, such as one or more components of automated assistant 120. Moreover, while operations of method 700 are shown in a particular order, this is not meant to be limiting. While dashed lines are include in FIG. 7 to denote optional processes, one or more of other operations may be reordered, omitted or added.

At block 702, an implementation of the method 700 may include receiving a spoken, typed, or visual query from a user. Receiving the query may include processes to determine attributes regarding the received query to be used to logically link the query to a historically established metric. Examples of attributes may include: a topic, a detected activity of the user at the time, a muted setting, a repeat effort, as well as whether the query was spoken or the user prompted.

At 704, the system may determine whether the volume setting for response has been set at a volume level that is less than some muted threshold. For instance, an illustrative muted threshold may be some setting softer than at full volume, and more likely around 5% to 30% of maximum volume.

At 706, the system may generate a muted response, such as response that has one of a low response volume (e.g., muted) setting, a visual-only display, or a combination of a display and a muted audible response.

A second, repeated query may be received at 708. As indicated at 710, the system may determine that the query at 708 was repeated within a preset window of time.

Having established the presence of the muted setting at 604 and attributes comprising the repeated query, the method 700 may retrieve a metric best matched with the attribute(s) at 706. The metric may be in line with a probability that the user desires or otherwise expects to receive an audible response.

An implementation of the method 700 at 712 may increase or otherwise adjust the volume of the response volume setting. An increase may be incremental or made according to some other preset protocol, such as adjusting the volume up to a level loud enough for the user to hear. The increased volume setting of the response level may be recorded at 712, as well. The recorded volume setting may be used as a baseline to further adjust the volume setting, as well as to anticipate a volume setting of a future response according to an associated metric.

The system performing the method 700 may provide an audible response to the user at 714 at the adjusted volume setting. User feedback may be uploaded at 716 to a server managing the invoked repeated response metric. For instance, a user may indicate that the response was helpful (e.g., by not repeating the query) or may indicate that the query didn't fully answer their question (e.g., by submitting another query). Results and feedback may be coalesced at 718 to update the applicable metric for a next occurrence and automated audible response.

Figure 8:
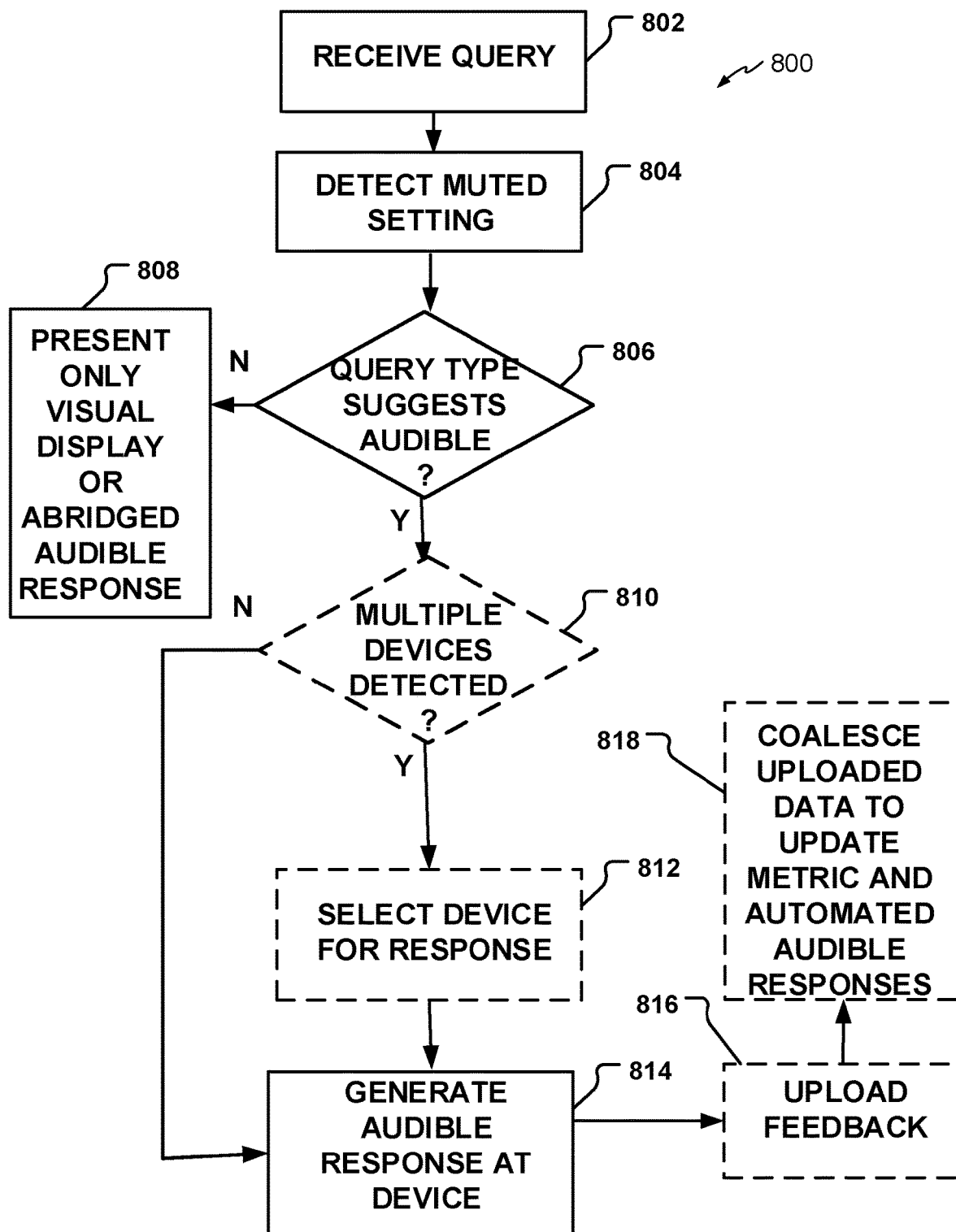
FIG. 8 is a flowchart illustrating an example method according to another implementation disclosed herein.

FIG. 8 is a flowchart illustrating an example method 800 according to implementations disclosed herein. For convenience, the operations of the flowchart are described with reference to a system that performs the operations. This system may include various components of various computer systems, such as one or more components of automated assistant 120. Moreover, while operations of method 800 are shown in a particular order, this is not meant to be limiting. While dashed lines are include in FIG. 8 to denote optional processes, one or more of other operations may be reordered, omitted or added.

At block 802, an implementation of the method 800 may include receiving a spoken, typed, or visual query from a user. Receiving the query may include processes to determine attributes regarding the received query to be used to logically link the query to a historically established metric. For example, the metric detected at 802 may relate to a type of response whose effectiveness at communicating improves greatly from including sound. Such may be the case when hearing a sound is integral to understanding the query. For instance, a user may inquire as to what noise a badger makes.

At 804, the system may determine whether the volume setting for response has been set at a volume level that is less than some muted threshold. For instance, an illustrative muted threshold may be some setting softer than at full volume, and more likely around 0% to 30% of maximum volume.

Having established the presence of the muted setting at 804 and derived one more attributes from the query at 802, the method 800 may retrieve the metric (e.g., type metric 218 of FIG. 2) best matched with the attribute(s) at 806. The metric may be associated with the query based on an assigned probability. In one example, the metric may be used to provide an audible response to the user at 814 at the adjusted volume setting.

Where multiple devices are detected at 810, the method 800 may automatically select a most appropriate digital assistant at 812 from which the response may be delivered to the user. Such a scenario is explained in FIG. 4.

User feedback may be uploaded at 818 to a server managing the invoked metric. For instance, a user may indicate that the response was helpful (e.g., by not repeating the query) or may indicate that the query didn't fully answer their question (e.g., by submitting another query). Results and feedback may be coalesced at 818 to update the applicable metric for a next occurrence and automated audible response.

Figure 9:
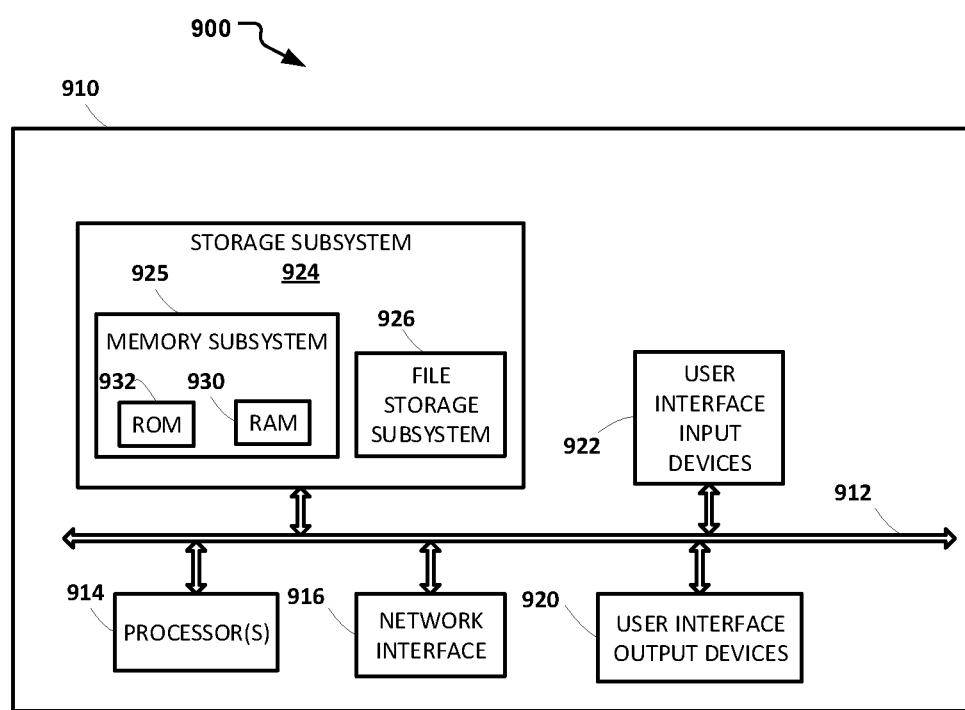
FIG. 9 illustrates an example architecture of a computing device.

FIG. 9 is a block diagram of an example computing device 910 that may optionally be utilized to perform one or more aspects of techniques described herein. In some implementations, one or more of a client computing device, user-controlled resources engine 134, and/or other component(s) may comprise one or more components of the example computing device 910.

Computing device 910 typically includes at least one processor 914 that communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The user interface input devices 922 of an implementation may include a response volume setting, among other features. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method of FIGS. 5-8, as well as to implement various components depicted in FIGS. 1 and 2.

These software modules are generally executed by processor 914 alone or in combination with other processors. Memory 925 used in the storage subsystem 924 may include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

The computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In some implementations, a method includes receiving a query from a user at a user interface of a computing device and detecting that a response volume setting, of an automated assistant of the computing device, is muted. The method may further include determining, based on a metric derived from historical manual volume adjustments for one or more past queries having a determined relationship to the query, that the user submitted the query with an expectation of audibly perceiving an audible response to the query. Based on the detected response volume setting and the metric, the method may automatically adjust the detected response volume setting and render the audible response to the query at a speaker of the computing device and at the adjusted response volume setting.

According to one or more implementations, the one or more past queries, based on which the metric is derived, are each a corresponding repeated submission following a corresponding initial submission when a corresponding response volume setting was muted, and where the metric is derived based on a quantity of the historical manual volume adjustments that occurred before the corresponding repeated submissions. The corresponding repeated submissions are restricted to those submitted within a preset time window relative to the corresponding initial submissions or relative to an end of corresponding initial responses to the initial submissions. An implementation of the method may determine the metric.

An implementation of the method may, based on the metric, visually prompt, on a display of the computing device the user to confirm the expectation, where automatically adjusting the detected response volume setting is further in response to receiving affirmative user interface input responsive to the visual prompt. The metric may be stored in association with a query type, where the one or more past queries have the query type, and further include identifying the metric based on the query being of the query type.

An implementation of the method may determine the metric by detecting contextual and environmental information regarding the user at a time of the query. The method may detect that the response volume setting is less than a threshold. For example, the threshold may be a value that is less than thirty percent of a maximum volume setting.

An implementation of the method may automatically adjust the detected response volume setting by increasing the detected volume setting by a preset increment. The method may generate the audible response, where generating the audible response comprises selecting, based on the metric, between a full version and an abridged version of the audible response. Based on the metric, the method may determine to not provide any visual response to the query.

According to an implementation, a system includes a processor and a memory in communication with the processor, where the memory stores instructions that, in response to execution of the instructions by the processor, cause the processor to perform the following operations: access historical data relating to a plurality of queries, generate a metric associated with a first type of query of the plurality of queries, where the metric is based on a quantity of occurrences, indicated by the historical data, of corresponding users repeating the first type of query and adjusting a response volume setting within a preset timeframe, based on the metric associated with the first type of query, cause a response characteristic to be executed automatically whenever the type of query is received from a user.

The processor of an implementation may be further configured to determine an attribute comprising the response volume setting being initially set a value that is lower than a preset threshold. The processor may further be configured to determine an attribute comprising user input allowing an audible response. The response characteristic may include an abridged or a non-abridged audible response, a visual only response, or a combination of a visual and an audible response. An implementation of the response characteristic may include at least one of automatically adjusting the response volume setting and prompting user input allowing an audible response. The processor of an implementation may further configured to provide to a third party information based on the historical data to be used to facilitate a generation of audible responses relating to the third party.

According to an implementation, at least one non-transitory computer-readable medium comprising instructions that, in response to execution of the instructions by one or more processors, cause the one or more processors to perform the following operations: receiving a query from a user at a user interface of a computing device, detecting that a response volume setting is muted, determining, based on a metric derived from historical manual volume adjustments for one or more past queries having a determined relationship to the query, that the user has an expectation of perceiving an audible response to the query, based on the detected response volume setting and the expectation of the user, automatically adjusting the detected response volume setting, and generating the audible response at a speaker of the computing device.

According to a particular implementation, the one or more processors may be further configured to determine the expectation based on a combination of a plurality of metrics that includes the metric.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    receiving a spoken query from a user via a user interface of an automated assistant;
    determining that, among multiple assistant devices, a first assistant device is closest to the user at a time of the spoken query;
    determining that a first response volume setting, of the automated assistant at the first assistant device, is muted;
    determining that a second response volume setting, of the automated assistant at a second assistant device, of the multiple assistant devices, is non-muted;
    determining, based on a metric derived from historical information having a determined relationship to the spoken query, whether audibly perceiving an audible response to the spoken query is critical;
    in response to determining that audibly perceiving the audible response to the spoken query is critical, and in response to determining that the first assistant device is muted and the second assistant device is non-muted:
        rendering, at the second assistant device, the audible response to the spoken query.

2. The method of claim 1, further comprising:
    determining that the second assistant device is within a threshold distance of the user at the time of the spoken query;
    wherein rendering, at the second assistant device, the audible response to the spoken query, is further in response to determining that the second assistant device is within the threshold distance.

3. The method of claim 2, wherein rendering, at the second assistant device, the audible response to the spoken query, is further in response to determining that the second assistant device is a closest non-muted device, of the multiple assistant devices, to the user at the time of the spoken query.

4. The method of claim 1, further comprising:
    in response to determining that audibly perceiving the audible response to the spoken query is not critical, and in response to determining that the first assistant device is the closest to the user at the time of the spoken query:
        rendering, at only the first assistant device, a visual only response to the spoken query.

5. The method of claim 1, wherein determining that the first response volume setting is muted comprises determining that the first response volume setting is below a threshold.

6. The method of claim 5, wherein the threshold is thirty percent, or less, of a maximum volume setting.

7. The method of claim 1, wherein determining that the second response volume setting is non-muted comprises determining that the second response volume setting is at or above a threshold.

8. The method of claim 7, wherein the threshold is thirty percent, or greater, of a maximum volume setting.

9. The method of claim 1, wherein determining, based on the metric derived from the historical information having the determined relationship to the spoken query, whether audibly perceiving the audible response to the spoken query is critical, comprises:
    determining the metric based on historical analysis of one or more past submissions of the spoken query and/or of one or more similar queries.

10. The method of claim 1, wherein determining, based on the metric derived from the historical information having the determined relationship to the spoken query, whether audibly perceiving the audible response to the spoken query is critical, comprises:
    determining the metric based on historical analysis of one or more past instances of the audible response and/or of one or more similar audible responses.

11. An electronic system comprising:
    one or more processing devices;
    one or more non-transitory machine-readable storage devices for storing instructions that are executable by the one or more processing devices to perform operations comprising:
        receiving a spoken query from a user via a user interface of an automated assistant;
        determining that, among multiple assistant devices, a first assistant device is closest to the user at a time of the spoken query;
        determining that a first response volume setting, of the automated assistant at the first assistant device, is muted;
        determining that a second response volume setting, of the automated assistant at a second assistant device, of the multiple assistant devices, is non-muted;
        determining, based on a metric derived from historical information having a determined relationship to the spoken query, whether audibly perceiving an audible response to the spoken query is critical;
        in response to determining that audibly perceiving the audible response to the spoken query is critical, and in response to determining that the first assistant device is muted and the second assistant device is non-muted:
            rendering, at the second assistant device, the audible response to the spoken query.

12. The electronic system of claim 11, wherein the one or more operations further comprise:
    determining that the second assistant device is within a threshold distance of the user at the time of the spoken query;
    wherein rendering, at the second assistant device, the audible response to the spoken query, is further in response to determining that the second assistant device is within the threshold distance.

13. The electronic system of claim 12, wherein rendering, at the second assistant device, the audible response to the spoken query, is further in response to determining that the second assistant device is a closest non-muted device, of the multiple assistant devices, to the user at the time of the spoken query.

14. The electronic system of claim 11, wherein the one or more operations further comprise:
    in response to determining that audibly perceiving the audible response to the spoken query is not critical, and in response to determining that the first assistant device is the closest to the user at the time of the spoken query:
        rendering, at only the first assistant device, a visual only response to the spoken query.

15. The electronic system of claim 11, wherein determining that the first response volume setting is muted comprises determining that the first response volume setting is below a threshold.

16. The electronic system of claim 15, wherein the threshold is thirty percent, or less, of a maximum volume setting.

17. The electronic system of claim 11, wherein determining that the second response volume setting is non-muted comprises determining that the second response volume setting is at or above a threshold.

18. The electronic system of claim 17, wherein the threshold is thirty percent, or greater, of a maximum volume setting.

19. The electronic system of claim 11, wherein determining, based on the metric derived from the historical information having the determined relationship to the spoken query, whether audibly perceiving the audible response to the spoken query is critical, comprises:
    determining the metric based on historical analysis of one or more past submissions of the spoken query and/or of one or more similar queries.

20. The electronic system of claim 11, wherein determining, based on the metric derived from the historical information having the determined relationship to the spoken query, whether audibly perceiving the audible response to the spoken query is critical, comprises:
    determining the metric based on historical analysis of one or more past instances of the audible response and/or of one or more similar audible responses.

* * * * *